Feb. 16, 1932.   G. A. ROBERDS   1,845,192
CYCLE PROPELLING MECHANISM
Filed June 21, 1930
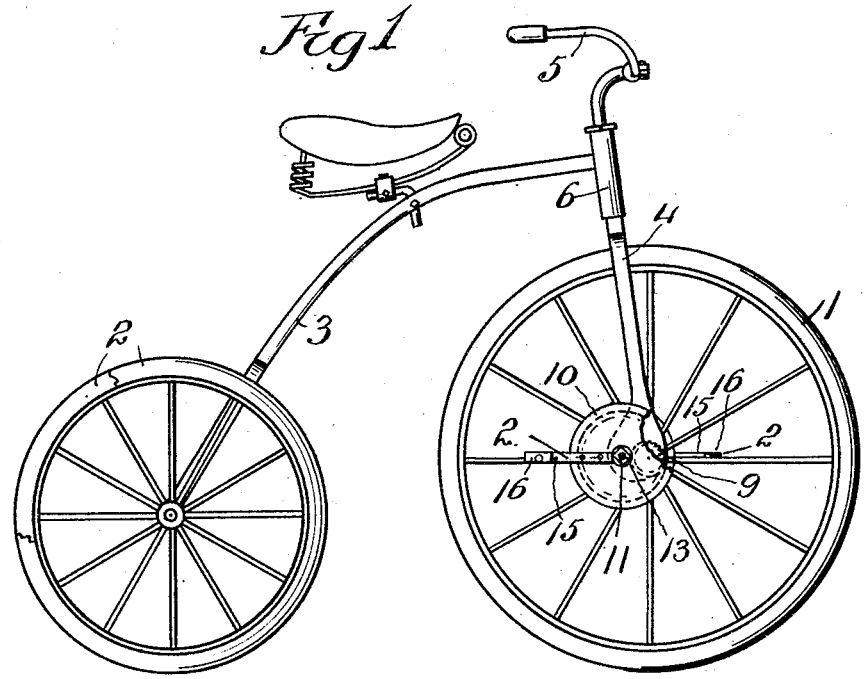
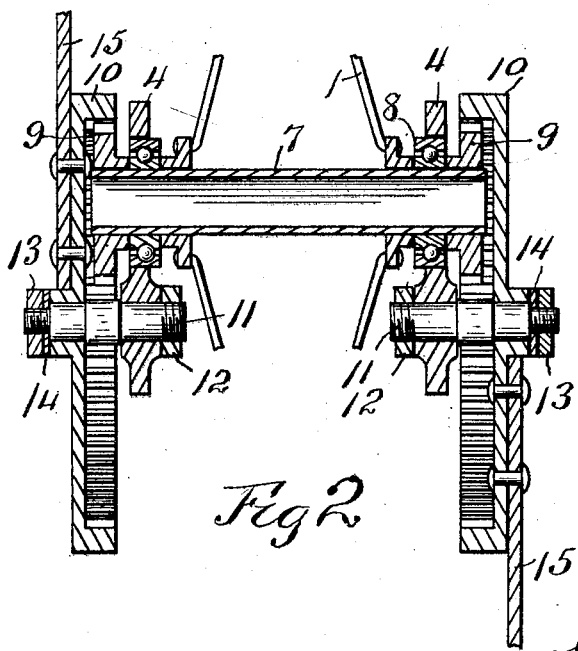
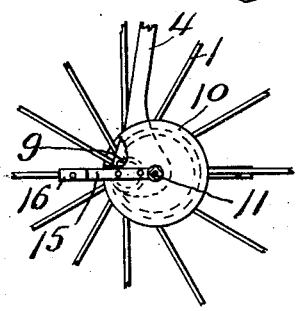
Witness
C. W. Olson
INVENTOR
Garfield A. Roberds
BY Warren D. House
His ATTORNEY Patented Feb. 16, 1932

1,845,192

UNITED STATES PATENT OFFICE

GARFIELD A. ROBERDS, OF OLATHE, KANSAS, ASSIGNOR OF ONE-HALF TO JOSEPH FELDMAN, OF OLATHE, KANSAS

CYCLE PROPELLING MECHANISM

Application filed June 21, 1930. Serial No. 462,863.

My invention relates to improvements in cycle propelling mechanism adapted for use on unicycles, bicycles, tricycles and motorcycles.

One of the objects of my invention is to provide a novel simple, cheap, strong and durable cycle propelling mechanism, which is not likely to get out of order, which is easy to operate, which eliminates the usual pedal shaft housing, and driving chain, while affording a multiplication in speed, and which is readily adaptable to cycles of usual type.

The novel features of my invention are hereinafter fully described and claimed.

In the accompanying drawings, which illustrate the preferred embodiment of my invention, as applied to a tricycle, Fig. 1 is a side elevation, partly broken away of my improved mechanism shown applied to a tricycle.

Fig. 2 is an enlarged horizontal sectional view, partly broken away, on the line 2—2 of Fig. 1.

Fig. 3 is a side elevation of my improved driving mechanism, partly broken away, looking at the left side of the cycle.

Similar characters of reference designate similar parts in the different views.

1 designates the front carrying wheel of the tricycle, 2 the rear wheels, 3 the frame having the front steering fork 4 having the usual handle bars 5. 6 designates the usual steering post of the frame.

7 designates a hub of the front carrying wheel 1, said hub being, preferably tubular, and mounted in bearings 8 of the usual ball type, the outer races thereof being respectively fastened to the arms of the fork 4.

Respectively fastened in a fixed position on the end portions of the hub 7 are two driven wheels 9 comprising spur gear wheels which respectively mesh with two internal gear wheels 10 respectively rotatably mounted on two studs 11, which are respectively fixed horizontally in the arms of the fork 4.

The inner ends of the studs are threaded and have respectively fitted on them nuts 12 which respectively bear against the arms of the fork 4. The studs 11 are shouldered so as to bear respectively against the outer sides of the arms of the fork. By having the studs 11 shouldered and extending through the arms of the fork and threaded at their inner ends, they provide bearing surfaces at the outer sides of the fork arms against which they may be firmly clamped by the nuts 12. In case a fork arm becomes bent in use, by removing the nut 12, the stud and the internal gear wheel 10 thereon may be removed from the fork arm without disassemblage of the gear wheel from the stud and without disassembling the adjacent nut 13 and collar 14.

After the fork arm has been straightened, it is replaced as a unit with the internal gear wheel, collar 14 and nut 13, and clamped in its operative position with the nut 12.

The shoulders on the studs 11 further serve as means for spacing the internal gear wheels from the hub 7 and ends of the gear wheels 9, and as abutments against which the collars 14 may bear without the collars bearing against the internal gear wheels.

The outer ends of the studs 11 are threaded and have respectively mounted on them nuts 13 which respectively bear against collars 14, which in turn respectively hold the internal gear wheels 10 on the studs 11.

Pedal cranks 15 respectively provided with the usual pedals 16 are respectively fastened to the internal gear wheels 10 so as to revolve therewith, and for driving said internal gear wheels.

When the pedal cranks 15 are operated in the usual manner they will rotate the wheel 1 through the intermediacy of the internal gear wheels 10, spur gears 9 and hub 7. The internal gear wheels 10 are larger in diameter than the gear wheels 9 so as to afford a multiplication in speed.

I do not limit my invention to the structure shown and described, as many modifications, within the scope of the appended claims, may be made without departing from the spirit of my invention.

What I claim is:—

1. In a cycle, the combination with a steering fork, a carrying wheel rotatable on and between the arms of said fork, two gear wheels fastened to and revoluble with said wheel, and two internal gear wheels respectively meshing with said two gear wheels at the outer sides of said fork arms, of two studs on which said internal gear wheels are respectively revoluble, said studs extending respectively through said fork arms and having threaded inner ends, and shoulders bearing against the outer sides of said arms, and two nuts on said threaded ends bearing against the inner sides of said fork arms.

2. In a cycle, the combination with a steering fork, a carrying wheel rotatable on and between the arms of said fork, two gear wheels fastened to and revoluble with said carrying wheel, and two internal gear wheels respectively meshing with said two gear wheels, of two studs on which said internal gear wheels are respectively revoluble, said studs extending respectively through said fork arms and having threaded inner and outer ends, and provided with shoulders respectively bearing against the outer sides of said fork arms at the inner sides of said internal gear wheels, two nuts respectively on the inner threaded ends of said studs and bearing against the inner sides of said fork arms, two collars on the threaded outer ends respectively of said studs and bearing respectively against said shoulders, and two nuts on the outer ends of said studs and respectively bearing against said collars, the latter being at the outer side of and holding said internal gear wheels on said studs.

In testimony whereof I have signed my name to this specification.

GARFIELD A. ROBERDS.